UNITED STATES PATENT OFFICE.

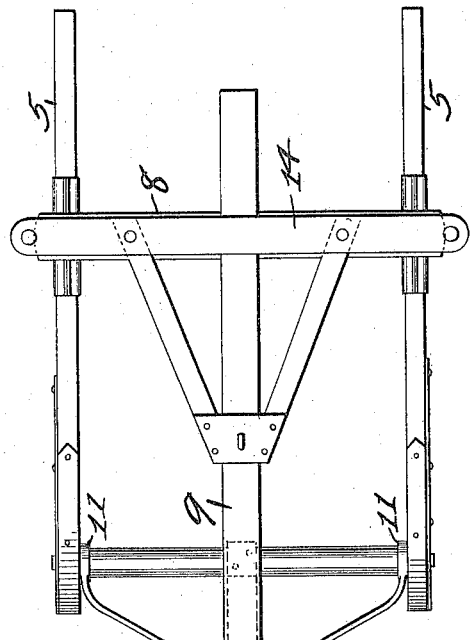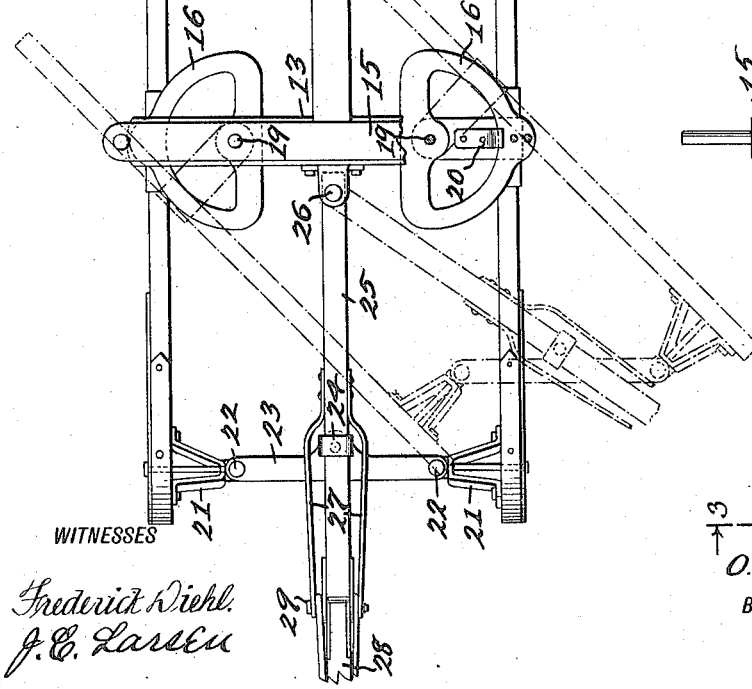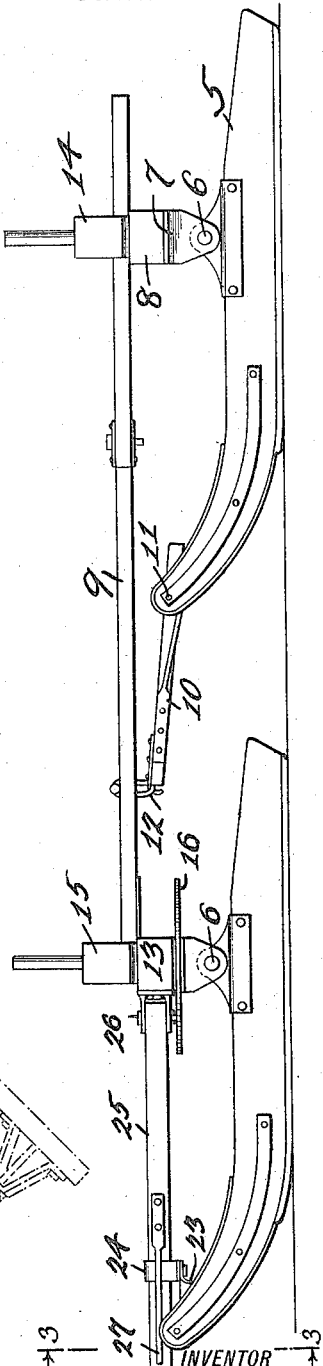

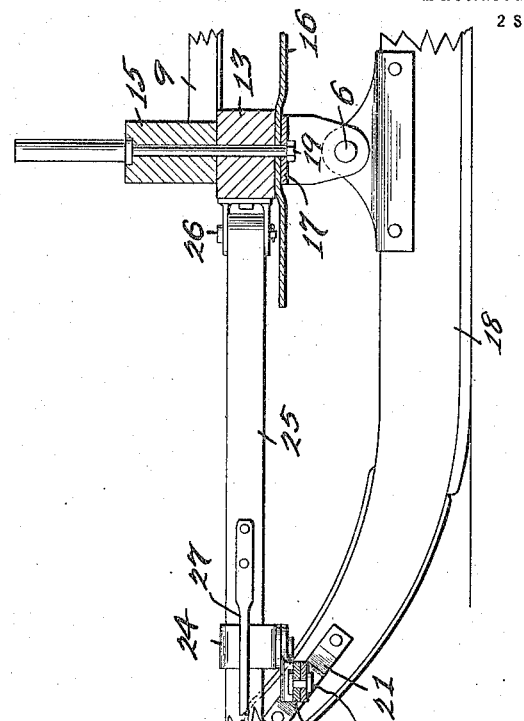
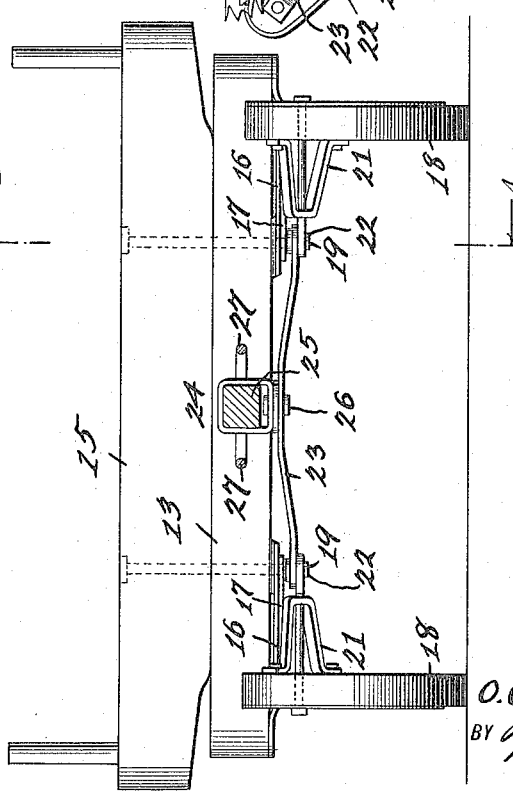

OLE O. BROTHEN, OF WESTBY, WISCONSIN.

SLED.

1,220,822.　　　　　Specification of Letters Patent.　　Patented Mar. 27, 1917.

Application filed May 15, 1916. Serial No. 97,622.

*To all whom it may concern:*

Be it known that I, OLE O. BROTHEN, a citizen of the United States, and a resident of Westby, in the county of Vernon and State of Wisconsin, have invented certain new and useful Improvements in Sleds, of which the following is a specification.

My invention relates to sleds, particularly for use on narrow roads and in rough country, and the main object thereof is to provide means for preventing tipping when making turns even with top heavy loads, and which means will maintain the load evenly balanced when turns are made.

A further object is to provide a structure wherein the inside runner advances and the outside runner recedes in making a turn, in the manner of an automobile.

A further object is to provide a circle on each side of the sled to serve as bearings for the runner beams, thus dispensing with the bolsters commonly employed and overcoming the common fault of bolsters to drop on the side of a turn.

And further objects are to provide such devices which are simple in construction and installation, comparatively inexpensive, thoroughly practical, and well adapted for the purpose for which they are intended.

My invention is fully described in the following specification, of which the accompanying drawings form a part, in which like characters refer to like parts in each of the views, and in which:—

Figure 1 is a side elevation of a sled constructed in accordance with my invention;

Fig. 2 is a plan view thereof;

Fig. 3 is a section taken on the line 3—3 of Fig. 1; and

Fig. 4 is a section taken on the line 4—4 of Fig. 3.

Referring to the drawings, 5 represent the rear runners pivoted, at 6, to bearings 7 secured beneath a transverse beam 8 slidably adjustable on a reach 9, a drag 10 being in pivotal connection with the runners 5 at 11 and with the reach 9 at 12, the latter connection being preferably adjustable on the reach, although not so shown.

The forward end of the reach is secured to a transverse beam 13, both the beams 8 and 13 being shown with superposed body bolsters 14 and 15, respectively, and the transverse beam 13 carries a circle 16 at each end thereof serving as bearings for the runner beams 17 of front runners 18, the runner beams 17 being in pivotal connection with the beam 13 at 19 and having clips 20 thereon for maintaining the same in engagement with the circles 16.

The forward ends of the front runners 18 are provided with inwardly directed brackets 21 carrying pivot pins 22 for the ends of a link 23, and said link carries a pivotally mounted band 24 for a pole 25 pivoted at its rear end to the transverse beam 13 at 26. As shown in Fig. 2, I prefer to use guards 27 along the path of travel of the band 24 on the pole 25, and I pivot a tongue 28 to the forward end of the pole 25, at 29.

As indicated by dotted lines in Fig. 2 the runners 18 may be swung upon their beam pivots 19 and be held in parallel relationship by means of the link 23, thereby advancing the near runner and retarding the far runner and bringing them closer together, as in a parallel rule, and thereby permitting a very short turn with no danger of upsetting the load, the circles 16 tending to prevent the latter.

In this swinging of the front runners 18 the pole 25 is free to slide through the band 24 without interfering in any way with the draft, the front runner beams 17 serving as offsets for the runners 18 to throw one rearwardly of the beam 13 and the other forwardly thereof in making a turn but maintaining the runners 18 in desired relationship while the sled is moving in a straight line.

My invention is very practical, highly efficient, and very inexpensive, and I reserve the right to make such changes over the form shown and described as properly come within the scope of the appended claim and within the spirit of the invention.

Having fully described my invention, what I claim as new, and desire to secure by Letters Patent, is:—

In a sled provided with rear and front runners, transverse beams thereover and a reach connecting said beams, offset means for pivoting said front runners to the respective beam, means for maintaining said front runners in parallelism, a pole pivoted to the forward transverse beam, a pivoted guide in which said pole is slidably held, and a tongue in pivotal connection with said pole.

OLE O. BROTHEN.